United States Patent Office 2,984,682
Patented May 16, 1961

2,984,682
SCHIFF BASE CARBAMATES

Warren W. Kaeding, Concord, Calif., assignor to The Dow Chemical Company, Midland, Mich., a corporation of Delaware No Drawing. Filed Nov. 4, 1959, Ser. No. 850,780

6 Claims. (Cl. 260—479)

The present invention is concerned with Schiff base carbamates and is more particularly directed to compounds having the structure

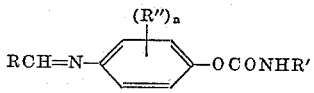

In this and succeeding formulas, R represents a lower alkyl radical containing from 2 to 7 carbon atoms, inclusive, R' is a lower alkyl radical containing from 1 to 4 carbon atoms, inclusive, R" is hydrogen or a lower alkyl radical containing from 1 to 4 carbon atoms, inclusive, $n$ is an integer of from 1 to 3, inclusive, and wherein when R" is a lower alkyl radical of at least one of which radicals is in a position meta to the ester group and the total carbon content of $(R")_n$ is not greater than 4.

The compounds of the present invention are light colored liquids or crystalline white solids. The compounds are soluble in polar organic solvents such as acetone, ethanol, methanol and propanol, somewhat soluble in hydrocarbons such as hexane, heptane, pentane, xylene, toluene and benzene, and substantially insoluble in water. These compounds are useful as parasiticides and are adapted to be employed for the control of insects, helminths, aphids, mites, bacteria and fungi.

The compounds of the present invention may be prepared by reacting an aliphatic aldehyde, RCHO, with a 4-aminophenol having the structure

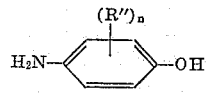

to produce an intermediate Schiff base phenol having the structure

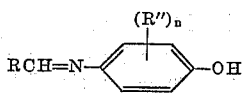

followed by the reaction of said intermediate Schiff base phenol with an alkyl isocyanate, R'NCO.

The first step of the reaction may be carried out by reacting a substantially equimolar proportion or slight excess of an aliphatic aldehyde with the appropriate 4-aminophenol. The reaction is usually carried out in the presence of a solvent or liquid reaction medium. Suitable solvents for use as reaction medium include water, alcohol, or water-alcohol mixture. The reaction takes place over a period of from about 5 minutes to 24 hours in the temperature range of from about 15° to 60° C. with the formation of the desired Schiff base phenol intermediate which usually precipitates in the reaction mixture as a solid or an oil. The Schiff base phenol intermediate may be recovered from the reaction mixture by conventional procedures such as filtration, decantation, vaporization of the solvent, and the like, and may thereafter be purified, if desired, by washing, decolorizing a solution thereof with activated charcoal and/or by recrystallization. Suitable solvents for recrystallization include pentane, hexane, isooctane and carbon tetrachloride.

In a modified procedure, it is frequently desirable to add the aldehyde to the amine in sufficient dilute mineral acid to maintain the amine in solution as its mineral acid salt. The preferred mineral acid is hydrochloric acid. After completion of the addition of the aldehyde and after insuring complete dispersion of the added aldehyde by vigorous stirring, sodium acetate is added to the mixture to react with the hydrochloride present. The mixture is then allowed to react at a temperature of from 20° to 60° C. for a period of from 0.25 to 2 hours. As the result of these operations a reaction takes place and the Schiff base phenol intermediate precipitates in the reaction mixture as a solid or an oil. The Schiff base phenol intermediate is then recovered by conventional procedures, and, if desired, purified as previously set forth.

In the second step of the reaction, a substantially equimolar proportion or slight excess of alkyl isocyanate is reacted with a Schiff base phenol intermediate prepared as above described. The reaction is preferably carried out in the presence of a catalyst. Suitable catalysts include triethylamine, trimethylamine and pyridine. The reaction is preferably carried out in the presence of a solvent. Preferred solvents are methylene dichloride, pentane and hexane. As a result of these operations, the desired Schiff base carbamate product is formed and remains in solution if solvent is employed. The product may be recovered as residue by evaporating or distilling off the solvent. The product may then be purified by washing or decolorizing a solution thereof with activated charcoal and if solid, by recrystallization from a suitable solvent such as pentane, hexane, carbon tetrachloride or isooctane.

In a preferred method for carrying out the reaction, the appropriate aldehyde is added to an aqueous hydrochloric acid solution of the appropriate 4-aminophenol. The amount of hydrochloric acid employed is that amount sufficient to form a salt with all of the reactant aminophenol. After completion of the addition, an amount of sodium acetate sufficient to react with the hydrochloride is added to the reaction mixture over a period of from 5 to 30 minutes. The mixture is then allowed to stand for from about 15 minutes to 1 hour whereupon a reaction takes place with the formation of the desired Schiff base phenol intermediate which precipitates therein. The latter is recovered and purified, if desired, by conventional procedures. The Schiff base phenol intermediate thus prepared is dissolved in a suitable solvent such as methylene dichloride and a substantially equimolar proportion of alkyl isocyanate and a few drops of triethylamine catalyst added thereto with stirring. The reaction mixture is allowed to stand overnight at room temperature to obtain the desired Schiff base carbamate product. The product is then recovered and purified, if desired, by conventional procedures.

The following examples illustrate the present invention but are not to be construed as limiting.

*Example 1.—4-(2-ethylbutylideneamino)-3,5-xylyl methylcarbamate*

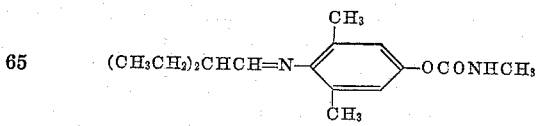

35 grams (0.35 mole) of 2-ethylbutyraldehyde was added with vigorous stirring to a solution of 34.3 grams (0.25 mole) of 4-amino-3,5-xylenol in 250 milliliters of 1.03 normal aqueous hydrochloric acid. The resultant slurry was treated with 35 grams of sodium acetate trihydrate over a period of about 40 minutes at room temperature whereupon a reaction took place with the formation of an oily brown solid. The latter was recovered by filtration and purified by washing successively with water and hexane, decolorizing a carbon tetrachloride solution thereof with charcoal, and recrystallizing successively from carbon tetrachloride–hexane and methylene dichloride to obtain 4 - (2-ethylbutylideneamino) - 3,5-xylenol (Schiff base phenol) intermediate as colorless needles having a melting point of 120°–122° C.

6.5 milliliters (0.114 mole) of methyl isocyanate and a few drops of triethylamine catalyst were added to a solution of 22.5 grams (0.103 mole) of 4-(2-ethylbutylideneamino)-3,5-xylenol prepared as above described in 100 milliliters of methylene dichloride. The resulting mixture was allowed to stand overnight at room temperature whereupon a small amount of high melting solid by-product precipitated which was removed by filtration. A portion of the solvent was then evaporated off from the filtrate and pentane added to the remaining mixture to precipitate the desired 4-(2-ethylbutylideneamino)-3,5-xylyl methylcarbamate product. The latter was recrystallized from hexane to obtain a purified product melting from 85° to 89° C. The product had a nitrogen content of 10.05 percent. The theoretical value is 10.14 percent.

*Example 2.—4-(2-ethylhexylideneamino)-3,5-xylyl methylcarbamate*

40 grams (0.31 mole) of 2-ethylcaproaldehyde was added at room temperature and with vigorous stirring to a solution of 34.3 grams (0.25 mole) of 4-amino-3,5-xylenol in 250 milliliters of 1.03 normal hydrochloric acid. To the resulting mixture was added over a period of 15 minutes, 35 grams of sodium acetate trihydrate. A reaction took place with the formation of an oily solid which was then separated by filtration and washed with water. The solid was purified by decolorizing a hexane solution thereof with charcoal, concentrating the decolorized hexane solution and crystallizing therefrom at 10° C. to obtain a 4-(2-ethylhexylideneamino) - 3,5-xylenol intermediate as a white solid having a melting point of 73°–74° C.

4.4 milliliters (10 percent molar excess) of methyl isocyanate and a few drops of triethylamine catalyst were added to a solution of 17 grams (0.069 mole) of 4-(2-ethylhexylideneamine) - 3,5-xylenol in 100 milliliters of methylene dichloride and the resulting mixture allowed to stand overnight. At the end of this period the solvent was distilled at reduced pressure (100° C., 20 millimeters of mercury) to recover as residue a 4-(2-ethylhexylideneamino)-3,5-xylyl methylcarbamate product as a heavy, amber-colored oil having a molecular weight of 304. The nitrogen content of the product was 8.88 percent; the theoretical value is 9.20 percent. The product had major infrared absorption peaks at the at the following wave lengths: $3.0\mu$, $3.35\mu$, $5.8\mu$, $6.0\mu$, $6.8\mu$, $8.0\mu$, $8.4\mu$, $8.7\mu$, $9.1\mu$, $9.8\mu$, $10.3\mu$, $10.8\mu$, $11.6\mu$.

*Example 3.—4-(2-ethylbutylideneamino) - 2,3,5-trimethylphenyl methylcarbamate*

12.75 grams (0.086 mole) of 4-amino-2,3,5-trimethylphenol (M.P. 152°–154° C.) was added to 35 milliliters of ethanol and the resultant slurry warmed to 50° C. 35 milliliters of water was then added thereto and the temperature of the mixture again brought to 50° C. To the resultant mixture, 13 grams (0.13 mole) of 2-ethylbutyraldehyde was added with vigorous stirring whereupon a reaction took place with the formation of an oil which separated to form a second layer. About 5 minutes after completion of the addition of the aldehyde, ice was added to the reaction mixture followed by water in amount sufficient to increase the volume three- to fourfold. As a result of these operations, the oil solidified to a tan-colored solid. The latter was recovered from the reaction mixture by filtration, washed with water and recrystallized from hexane to obtain a 4-(2-ethylbutylideneamino)-2,3,5 - trimethylphenol intermediate as a white solid melting at 100°–102.5° C.

11.5 grams (0.05 mole) of the 4-(2-ethylbutylideneamino)-2,3,5-trimethylphenol intermediate thus prepared was reacted with 3.5 milliliters (20 percent molar excess) of methyl isocyanate in 75 milliliters of methylene dichloride to obtain a 4-(2-ethylbutylideneamino)-2,3,5-trimethylphenyl methylcarbamate product as a very viscous yellow oil having a refractive index, $n_D^{25°}$ of 1.5300. The product had elemental analyses (in percent) as follows:

|  | Carbon | Hydrogen | Nitrogen |
| --- | --- | --- | --- |
| Theory | 70.31 | 9.03 | 9.65 |
| Found | 70.74 | 9.24 | 9.31 |

*Example 4.—5-(2-ethylbutylideneamino)carvacryl methylcarbamate*

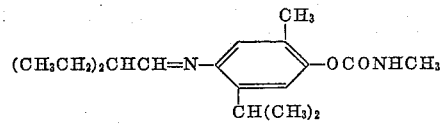

15.5 grams (0.094 mole) of 4-amino-5-isopropyl-2-methylphenol was slurried into a mixture of 40 milliliters of ethanol and 40 milliliters of water. The resulting slurry was heated to 50° C. and 15 grams (0.15 mole) of 2-ethylbutyraldehyde added thereto with stirring. A reaction took place almost immediately with the formation of an oil which remained suspended in the mixture. The reaction mixture was maintained at this temperature for about 5 minutes and thereafter cooled to 0° C. by the addition of ice and water whereupon a light brown oil settled out of suspension. The oil was extracted from the mixture with pentane and the pentane extract decolorized with activated charcoal. The pentane was then removed by distillation under reduced pressure to recover as residue a 4 - (2-ethylbutylideneamino)-5-isopropyl-2-methylphenol intermediate as a pale yellow liquid having a refractive index $n_D^{25°}$ of 1.5225.

In a manner similar to that previously described, 15 grams (0.061 mole) of the 4-(2-ethylbutylideneamino)-5-isopropyl-2-methylphenol intermediate thus prepared was reacted with 4 grams (0.07 mole) of methyl isocyanate to obtain a 5-(2-ethylbutylideneamino)carvacryl methylcarbamate product as a glassy solid having a molecular weight of 304. The product had elemental analyses (in percent) as follows:

|  | Carbon | Hydrogen | Nitrogen |
| --- | --- | --- | --- |
| Theory | 71.02 | 9.27 | 9.20 |
| Found | 71.20 | 9.74 | 9.57 |

*Example 5.—4-isobutylideneamino-2,3,5-trimethylphenyl methylcarbamate*

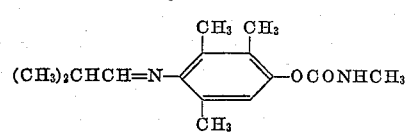

10 grams (0.10 mole) of isobutyraldehyde was added with vigorous stirring in the temperature range of from 50° to 60° C. to a slurry of 13 grams (0.086 mole) of 4-amino-2,3,5-trimethylphenol in 70 milliliters of a 50–50 parts by volume alcohol-water mixture. The reaction mixture was maintained in the temperature range of from 50° to 60° C. for 5 minutes and thereafter poured into ice and water to quench the reaction. As a result of these operations a brown oil precipitated which slowly crystallized when the mixture was maintained at 0° C. The crystalline material was recovered by filtration, washed with cold pentane and recrystallized from hexane to obtain a 4-isobutylideneamino-2,3,5-trimethylphenol intermediate as fluffy white needles melting from 87° to 90° C.

In a manner similar to that previously described, a solution of 9.0 grams (0.044 mole) of the 4-isobutylideneamino-2,3,5-trimethylphenol intermediate thus prepared in 50 milliliters of methylene dichloride was reacted with 3.5 milliliters (0.061 mole) of methyl isocyanate to obtain a 4-isobutylideneamino-2,3,5-trimethylphenyl methylcarbamate product as a glassy white solid having a molecular weight of 262. The product had elemental analyses (percent) as follows:

|  | Carbon | Hydrogen | Nitrogen |
|---|---|---|---|
| Theory | 68.67 | 8.45 | 10.68 |
| Found | 68.23 | 8.59 | 10.79 |

Example 6.—4-isobutylideneamino-3,5-xylyl methylcarbamate

In a manner similar to that previously described, 37 grams (0.51 mole) of isobutyraldehyde and 50 grams (0.37 mole) of 4-amino-3,5-xylenol were reacted in 50–50 (by volume) ethanol-water to obtain 43.5 grams of a 4-isobutylideneamino-3,5-xylenol intermediate which after recrystallization from hexane melted from 107° to 112° C.

12 milliliters (0.21 mole) of methyl isocyanate and a few drops of triethylamine catalyst were added to a solution of 30 grams (0.157 mole) of the 4-isobutylideneamino-3,5-xylenol intermediate prepared as above described in about 250 to 300 milliliters of methylene dichloride. The reaction mixture was allowed to stand overnight at room temperature whereupon a small amount of high melting solid by-product formed. The latter was removed by filtration and the solvent evaporated from the filtrate to recover as residue a viscous brown oil. The latter was purified by dissolving in 50 milliliters of carbon tetrachloride and adding the resulting solution to 1.5 liters of boiling hexane. The hot solution was filtered to remove insoluble by-product, the filtrate cooled and concentrated to about 500 milliliters. The resultant solution was allowed to stand overnight at 10° C. to obtain a 4-isobutylideneamino-3,5-xylyl methylcarbamate product as white granular crystals melting from 80° to 83° C. The product had elemental analyses (in percent) as follows:

|  | Carbon | Hydrogen | Nitrogen |
|---|---|---|---|
| Theory | 67.76 | 8.12 | 11.28 |
| Found | 67.79 | 8.16 | 11.42 |

Example 7.—4-(2-methylpentylideneamino)-3,5-xylyl methylcarbamate

In a manner similar to that described in Example 2, 30 grams (0.30 mole) of 2-methylvaleraldehyde was added to a solution of 34.3 grams (0.25 mole) of 4-amino-3,5-xylenol in 250 milliliters of 1.03 normal hydrochloric acid followed by the addition of 35 grams of sodium acetate trihydrate to produce a 4-(2-methylpentylideneamino)-3,5-xylenol intermediate having a melting point of 86°–88° C.

4 milliliters (10 percent molar excess) of methyl isocyanate and a few drops of trimethylamine catalyst were then added to a solution of 13 grams (0.06 mole) of the 4-(2-methylpentylideneamino)-3,5-xylenol intermediate prepared as above described in 50 milliliters of methylene dichloride. The reaction mixture was allowed to stand overnight at room temperature and then heated to 100° C. at 2 millimeters of mercury pressure to remove the solvent and to recover as residue a 4-(2-methylpentylideneamino)-3,5-xylyl methylcarbamate product as an oily residue having a molecular weight of 276 and nitrogen content of 10.06 percent. The theoretical nitrogen content is 10.14 percent. The product had strong infrared absorption peaks at the following wave lengths: 3.0μ, 3.4μ, 5.8μ, 6.0μ, 6.6μ, 6.75μ, 8.0μ, 8.3μ, 8.6μ, 9.05μ, 9.75μ, 10.25μ, 10.75μ, 11.25μ, 13.0μ, 13.6μ.

Example 8.—5-ethyl-4-(2-methylpentylideneamino)-m-tolyl methylcarbamate

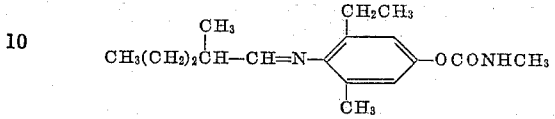

In a manner similar to that described in Examples 2 and 7, a 5-ethyl-4-(2-methylpentylideneamino)-m-cresol intermediate having a melting point of 64°–65° C. was prepared by the reaction of 20 grams (0.20 mole) of 2-methylvaleraldehyde and 20 grams (0.133 mole) of 5-ethyl-4-amino-m-cresol.

In a manner similar to that previously described, 14 grams (0.057 mole) of the 5-ethyl-4-amino-m-cresol intermediate thus prepared was reacted with 4 grams (0.07 mole) of methyl isocyanate in methylene dichloride solution to obtain a viscous brown oil having a refractive index, $n_D^{21°}$ of 1.5241. The product has a carbon content of 70.00 percent, a hydrogen content of 8.75 percent and a nitrogen content of 8.96 percent. The theoretical values are carbon 70.30 percent, hydrogen 9.03 percent and nitrogen 9.65 percent.

Example 9

In operations carried out in the similar manner, the following methylcarbamates were prepared:

4-isobutylideneamino-2,3-xylyl methylcarbamate melting from 80° to 83° C. by the reaction of isobutyraldehyde with 4-amino-3,5-xylenol to produce an intermediate 4-isobutylideneamino-3,5-xylenol followed by the reaction of the latter with methyl isocyanate.

4-(2-methylpentylideneamino)phenyl methylcarbamate as an oil having a molecular weight of 248 by the reaction of 2-methylvaleraldehyde with p-aminophenol to produce an intermediate 4-(2-methylpentylideneamino)-phenol followed by the reaction of the latter with methyl isocyanate.

5-ethyl-4-(2-ethylbutylideneamino)-m-tolyl methylcarbamate as a brown oil having a refractive index, $n_D^{25°}$ of 1.5240 by the reaction of 2-ethylbutyraldehyde with 4-amino-5-ethyl-m-cresol to produce an intermediate 5-ethyl-4-(2-ethylbutylideneamino)-m-cresol intermediate followed by the reaction of the latter with methyl isocyanate.

Example 10.—4-isobutylideneamino-3,5-xylyl normal-butylcarbamate

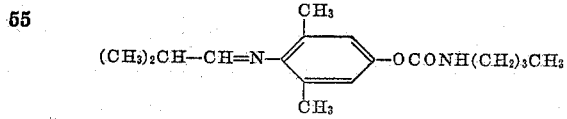

37 grams (0.51 mole) of isobutyraldehyde is added to a slurry of 50 grams (0.37 mole) of 4-amino-3,5-xylenol in 240 milliliters of a 50–50 by volume ethanol-water mixture at a temperature of 50° C. A reaction starts to take place immediately and after about 5 minutes, the product precipitates as a heavy oil. Ice and water are immediately added to the mixture whereupon the oil solidifies. The latter is separated from the mixture, washed with water and recrystallized from hexane to produce a 4-isobutylideneamino-3,5-xylenol intermediate as a white solid melting from 107° to 112° C.

17 milliliters (0.30 mole) of normal-butyl isocyanate and a few drops of triethylamine catalyst are added to a solution of 33 grams (0.20 mole) of 4-iso-butylideneamino-3,5-xylenol, prepared as above described, in 100 milliliters of methylene dichloride solvent. The resulting mixture is allowed to stand overnight at room temperature whereupon a reaction takes place with the formation of the desired 4-isobutylideneamino-3,5-xylyl normal-butylcarbamate product. The latter is recovered from the reaction mixture as residue by vaporizing off the solvent. The product has a molecular weight of 293.

*Example 11.—6-(2-ethylbutylideneamino)thymyl normal-propylcarbamate*

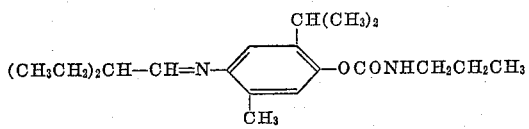

15 grams (0.15 mole) of 2-ethylbutyraldehyde is added with vigorous stirring in the temperature range of 50° to 60° C. to a slurry of 16.5 grams (0.1 mole) of 4-amino-2-isopropyl-5-methylphenol in 70 milliliters of 50–50 parts by volume ethanol-water mixture. The reaction mixture is maintained in the temperature range of from 50° to 60° C. for about 15 minutes and thereafter poured into an ice water mixture to precipitate a 4-(2-ethylbutylideneamino)-2-isopropyl-5-methylphenol intermediate having a molecular weight of 247.

In a manner similar to that previously described, 12.4 grams (0.05 mole) of the 4-(2-ethylbutylideneamino)-2-isopropyl-5-methylphenol intermediate thus prepared is reacted with 3.5 milliliters (0.061 mole) of normal-propyl isocyanate to obtain a 6-(2-ethylbutylideneamino) thymyl normal-propylcarbamate product having a molecular weight of 352.

*Example 12*

In preparations carried out in a manner similar to that previously described the following Schiff base carbamates are prepared:

4-isobutylideneamino-m-tolyl methylcarbamate having a molecular weight of 234 by the reaction of isobutyraldehyde with 4-amino-m-cresol to produce an intermediate 4-isobutylideneamino-m-cresol intermediate followed by the reaction of the latter with methyl isocyanate.

4-(2-ethylbuylideneamino)-3-isopropylphenyl methylcarbamate having a molecular weight of 290 by the reaction of 2-ethylbutyraldehyde with 4-amino-3-isopropylphenol to produce an intermediate 4-(2-ethylbutylideneamino)-3-isopropylphenol followed by the reaction of the latter with methyl isocyanate.

4-(2-ethylbutylideneamino)-3,5-xylyl ethylcarbamate having a molecular weight of 290 by the reaction of 2-ethylbutyraledhyde with 4-amino-3,5-xylenol to produce an intermediate 4-(2-ethylbutylideneamino)-3,5-xylenol followed by the reaction of the latter with ethyl isocyanate.

5-ethyl-4-(2-methylpentylideneamino)-m-tolyl normal-propylcarbamate having a molecular weight of 318 by the reaction of 2-methylvaleraldehyde with 4-amino-5-ethyl-m-cresol to produce an intermediate 5-ethyl-4-(2-methylpentylideneamino)-m-cresol followed by the reaction of the latter with normal-propyl isocyanate.

4-isobutylideneamino-2,3,5-trimethylphenyl isobutylcarbamate having a molecular weight of 305 by the reaction of isobutyraldehyde with 4-amino-2,3,5-trimethylphenol to produce the intermediate 4-isobutylideneamino-2,3,5-trimethylphenol followed by the reaction of the latter with isobutyl isocyanate.

4-normal-butylideneamino-3-tertiary-butylphenyl methylcarbamate having a molecular weight of 277 by the reaction of normal-butyraldehyde with 4-amino-3-tertiary-butylphenol to produce the intermediate 4-normal-butylideneamino-3-tertiary-butylphenol followed by the reaction of the latter with methyl isocyanate.

4-normal-propylideneamino-m-cumenyl ethylcarbamate having a molecular weight of 262 by the reaction of propionaldehyde with 4-amino-3-isopropylphenol to produce an intermediate 3-isopropyl-4-normal-propylideneaminophenol followed by the reaction of the latter with ethyl isocyanate.

4-normal-propylideneamino-3,5-xylyl methylcarbamate having a molecular weight of 234 by the reaction of propionaldehyde with 4-amino-3,5-xylenol to produce an intermediate 4-normal-propylideneamino-3,5-xylenol followed by the reaction of the latter with methyl isocyanate.

4-normal-butylideneaminophenyl methylcarbamate having a molecular weight of 220 by the reaction of normal-butyraldehyde with p-aminophenol to produce an intermediate 4-normal-butylideneaminophenol followed by the reaction of the latter with methyl isocyanate.

The products of the present invention are useful as parasiticides for the control of such species as two spotted spider mites (*Tetranychus bimaculatus*), bean aphids (*Aphis fabae*), cockroach (*Americana periplaneta*), house flies (*Musca domestica*) and plum curculio. They are also useful for the control of helminths, various pests attacking warm-blooded animals, and for bacteria and fungi.

The compounds having the structure

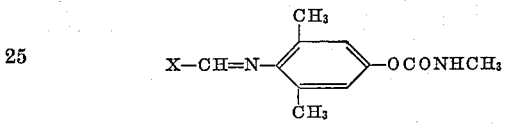

wherein X is an alkyl radical containing from 5 to 7 carbon atoms, inclusive, have outstanding activity against chewing type insects as represented by Mexican bean beetle (*Epilachna varivestis*) and southern army worm (*Prodenia eridania*). In representative operations for the control of chewing insects, 4-(2-ethylbutylideneamino)-3,5-xylyl methylcarbamate, 4-(2-methylpentylideneamino)-3,5-xylyl methylcarbamate and 4-(2-ethylhexylideneamino)-3,5-xylyl methylcarbamate were separately dispersed in water to prepare aqueous spray compositions containing 100 parts per million by weight of one of the compounds per million parts by weight of ultimate spray mixture. These compositions were separately applied to a series of cranberry bean plants in amounts sufficient to wet the leaf surfaces. The leaf surfaces were allowed to dry and the plants then infested with a known number of southern army worm larvae. Three days after infestation, the plants were examined to ascertain the control of southern army worms attributable to the test compounds. It was found that in all cases complete kills of southern army worm larvae were observed.

The reactant aminophenols may be prepared according to one of the following methods:

(A) Via an azo-coupling method wherein—

(1) An appropriate phenol in aqueous alkaline solution is reacted with diazotized sulfanilic acid in the temperature range of from −5° C. to 30° C. for from 5 minutes to 12 hours to produce an intermediate azo compound as its sodium salt.

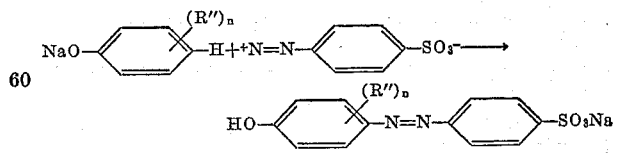

(2) The intermediate sodium salt of the azo compound is reduced by treating with sodium hydrosulfite at a temperature of from about 80° to 90° C. to produce a p-aminophenol.

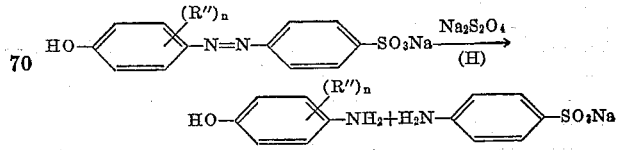

(B) Via a reductive alkylation method wherein—

(1) The appropriate phenol is nitrosated by portionwise addition with stirring of sodium nitrite to a mixture of the phenol and concentrated hydrochloric acid in an appropriate solvent such as ethanol at a temperature of from about 0° to about 15° C., and stirring the resulting mixture for a period of from 0.5 to 24 hours to produce the intermediate p-nitroso derivative of the phenol.

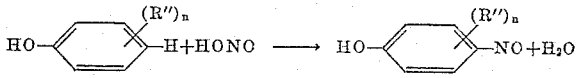

(2) The intermediate p-nitroso derivative of the phenol is reduced by treating with hydrogen in the presence of palladium on charcoal catalyst at a pressure of from 20 to 50 pounds per square inch and a temperature of from 20° to 75° C. to produce the desired aminophenol.

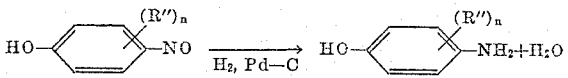

I claim:
1. A compound having the structure

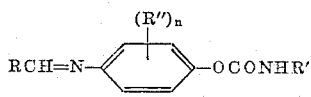

wherein R is a lower alkyl radical containing from 2 to 7 carbon atoms, inclusive, R' is a lower alkyl radical containing from 1 to 4 carbon atoms, inclusive, and R" is selected from the group consisting of hydrogen and a lower alkyl radical containing from 1 to 4 carbon atoms, inclusive, $n$ is selected from an integer of from 1 to 3, inclusive, and wherein when R" is a lower alkyl radical at least one of said radicals is in a position meta to the ester group and the total carbon content of $(R'')_n$ is not greater than 4.

2. 4 - (2 - ethylbutylideneamino) - 3,5 - xylyl methylcarbamate.

3. 4 - (2 - ethylhexylideneamino) - 3,5-xylyl methylcarbamate.

4. 4 - (2 - methylpentylideneamino) - 3,5-xylyl methylcarbamate.

5. 4-isobutylideneamino-3,5-xylyl methylcarbamate.

6. 4-isobutylideneamino-2,3,5-trimethylphenyl methylcarbamate.

References Cited in the file of this patent

J.A.C.S., vol. 63 (1941), pages 308–311.
Journal of Agricultural and Food Chemistry, vol. 2 (1954), pages 864–70.